United States Patent [19]

Wolf

[11] Patent Number: 5,649,832

[45] Date of Patent: Jul. 22, 1997

[54] DEVICE FOR TRANSMITTING SIGNALS BETWEEN TWO TERMINALS

[75] Inventor: Klaus-Uwe Wolf, Erlangen, Germany

[73] Assignee: Alcatel Kabel AG & Co, Germany

[21] Appl. No.: 616,728

[22] Filed: Mar. 15, 1996

[30] Foreign Application Priority Data

Mar. 30, 1995 [DE] Germany .................. 195 11 653.4

[51] Int. Cl.⁶ ............................................. H01R 35/04
[52] U.S. Cl. ........................................ 439/164; 439/15
[58] Field of Search ................................ 439/164, 15

[56] References Cited

U.S. PATENT DOCUMENTS

| | | | |
|---|---|---|---|
| 5,046,951 | 9/1991 | Suzuki | 439/164 |
| 5,219,460 | 6/1993 | Kato et al. | 439/164 |
| 5,224,871 | 7/1993 | Ida et al. | 439/15 |
| 5,277,604 | 1/1994 | Ida et al. | 439/164 |
| 5,409,389 | 4/1995 | Shibata et al. | 439/164 |

FOREIGN PATENT DOCUMENTS

| | | |
|---|---|---|
| 417350 | 3/1991 | European Pat. Off. . |
| 4211264 | 10/1992 | Germany . |

*Primary Examiner*—Gary F. Paumen
*Attorney, Agent, or Firm*—Ware, Fressola, Van Der Sluys & Adolphson LLP

[57] ABSTRACT

A device or transmitting signals between two terminals is indicated, where at least one of them is moveable with respect to the other. The terminals are connected by at least one line wound in turns, which is stored in an essentially circular cassette. The turns of the line are divided into an inner winding area and an outer winding area running in different directions, between which an approximately U-shaped reversing area is located. A one-piece ring-shaped guide (14) is located between the two winding areas and surrounds the reversing area of the turns. At least on the inside facing the inner winding area, the guide (14) has protrusions (15) that are distributed around the entire periphery and face radially out toward the center point (M), and which are offset with respect to each other in the peripheral direction. On the inside that faces the winding area, it has convex curved walls (16) between each two protrusions (15), where their minimum distance from the center point (M) of the guide (14) is larger than the minimum distance of the protrusions (15) from the same point. In the transition areas between the walls (16) and the protrusions (15), at least on the side that faces away from the direction of rotation of the guide (14) when the internal winding area increases, at least one nub (17) is located, which has a smaller minimum distance than the pertinent wall (16), but a larger minimum distance than the pertinent protrusion (15), from the center point (M) of the guide (14).

3 Claims, 1 Drawing Sheet

DEVICE FOR TRANSMITTING SIGNALS BETWEEN TWO TERMINALS

BACKGROUND OF THE INVENTION

1. Technical Field

The invention refers to a device for transmitting signals between two terminals, of which at least one is moveable with respect to the other, and which are connected by at least one conducting line wound in turns. Other conducting lines can be connected between the two terminals. The line is stored in an essentially circular cassette comprising a stator supporting one of the terminals and a rotor which rotates around its axis and with respect to the stator and supports the other terminal. The turns of the line are subdivided into an inner winding area and an outer winding area with different winding directions, between which an approximately U-shaped reversing area is located. A ring-shaped guide encompasses the reversing area of the turns is located between the two winding areas and can move in the peripheral direction of the cassette. At least the internal periphery of the ring-shaped guide is configured to receive the turns of the inner winding area.

Such a device is needed for example to transmit a signal for releasing the impact protection "airbag" in motor vehicles. It is located in the steering wheel of a motor vehicle for transmission of an electrical or optical signal. In the sense of the invention, the "line" can therefore be an electrical or an optical fiber line. A significant problem toward this device is the transmission signals between fixed and moveable parts of the motor vehicle. The sliding contacts or sliding rings that transmit current, which have been known a long time for such instances, are subject to wear and are particularly disadvantageous at low power due to the fluctuating transition resistances.

2. Description of the Prior Art

An electric current is used for the transmission of signals in the known device according to EP-OS 0 417 350. The transmission of current takes place through a flat ribbon line or cable wound by a kind of spring barrel into a winding body and stored in a cassette. During a relative rotating movement of the two terminals connected by the flat ribbon line, the wound flat ribbon line "breathes" like the spring of a watch. In one of the directions of rotation, the turns of the wound flat ribbon line are drawn together into a smaller diameter. In the other direction of rotation, they increase again into a larger diameter. In this way, the flat ribbon line can participate in the rotating movements of a steering wheel without interrupting the signal path. To be able to perform a sufficient number of rotations in both directions, a correspondingly long flat ribbon line is needed, which is found in a large number of turns in the cassette. In principle, this device can be used in practice. However, because of the long length of the line and its relatively high ohmic resistance, difficulties can occur with the signals to be transmitted, particularly in the presence of low currents.

In the device described in DE-OS 42 11 264, the length of the line between the two terminals is significantly shorter than in the above described device. The wound line is divided into inner and outer winding areas, in which the windings turn in different directions. The two winding areas are connected with each other by an approximately U-shaped reversing area. A ring-shaped guide is located between the two winding areas and surrounds the reversing area. The guide can move in the peripheral direction of the cassette. It is moved by the wound line or by its reversing area when the cassette rotor turns. The guide contains several rollers, which are offset with respect to each other in the peripheral direction and rotate respectively around an axis, to which one line each leads from the inner winding area and from the outer winding area when the rotor turns. The rollers prevent the inner winding area from resting too closely against the guide, which would jam it. The guide in this known device is expensive, especially because of the separate location of each roller.

SUMMARY OF THE INVENTION

It is an object of the invention to provide a device which is much simpler than the prior art. This object is fulfilled by the invention in that:

the guide is made of one piece and has radially outward pointing protrusions, at least on the inside that faces the inner winding area, which are radially offset with respect to each other in the peripheral direction, between each two protrusions on the inside facing the inner winding area, the guide contains convex curved walls whose minimum distance from the center point of the guide is larger than the minimum distance of the protrusions from the same point, and in the transition areas between the walls and the protrusions, at least on the side that faces away from the direction of rotation of the guide when the diameter inside the winding area increases, one nub each is located at a smaller minimum distance than the pertinent wall, but at a larger minimum distance than the pertinent protrusion, from the center point of the guide.

The guide of the device is made of one piece and therefore has a simpler construction. It is preferably made of plastic and can for example be manufactured in a single step by injection molding. No additional parts need to be manufactured separately nor mounted on the guide. The protrusions, nubs and convex walls provide a constantly interrupted peripheral surface of the guide with relatively few contact areas or points for the turn from the inner winding area which contacts the guide. In this way, the guide prevents the windings from wandering in the radial direction when the rotor turns, without the danger of the turn of the line jamming in the guide. This is of significance for the inner winding area, when the turns "open" in one rotation direction of the rotor, thereby pushing the guide. The protrusions that are offset with respect to each other, and the convex walls between them, make it possible to bend the turn of the line that contacts the guide between each two protrusions, until it rests against a convex wall. In this way the respective turn of the line always remains relatively loose. It cannot lie flat against the guide. In addition, the nubs located next to the protrusions ensure that the turn of the line contacting the guide does not fall into a depression and possibly gets jammed when the inner winding area increases and the guide in turn is "pushed" by the line that would otherwise be located in the transition area between a protrusion and an adjacent wall.

The invention will be fully understood when reference is made to the following detailed description taken in conjunction with the accompanying drawing.

BRIEF DESCRIPTION OF THE DRAWING

The drawing illustrates a configuration example of the subject of the invention, wherein.

DETAILED DESCRIPTION OF THE INVENTION

In the following, the invention will be explained for a device with a cassette in which a flat ribbon line or cable with electric conductors is located. However, a line with at least one optical fiber can also be used instead of the flat ribbon line. Even a combined line with electrical and optical conductors could be used. It is also possible in principle to locate two or more lines in the cassette. The following discusses only one flat ribbon line with electrical conductors, in lieu of all other possibilities.

Figure 1:
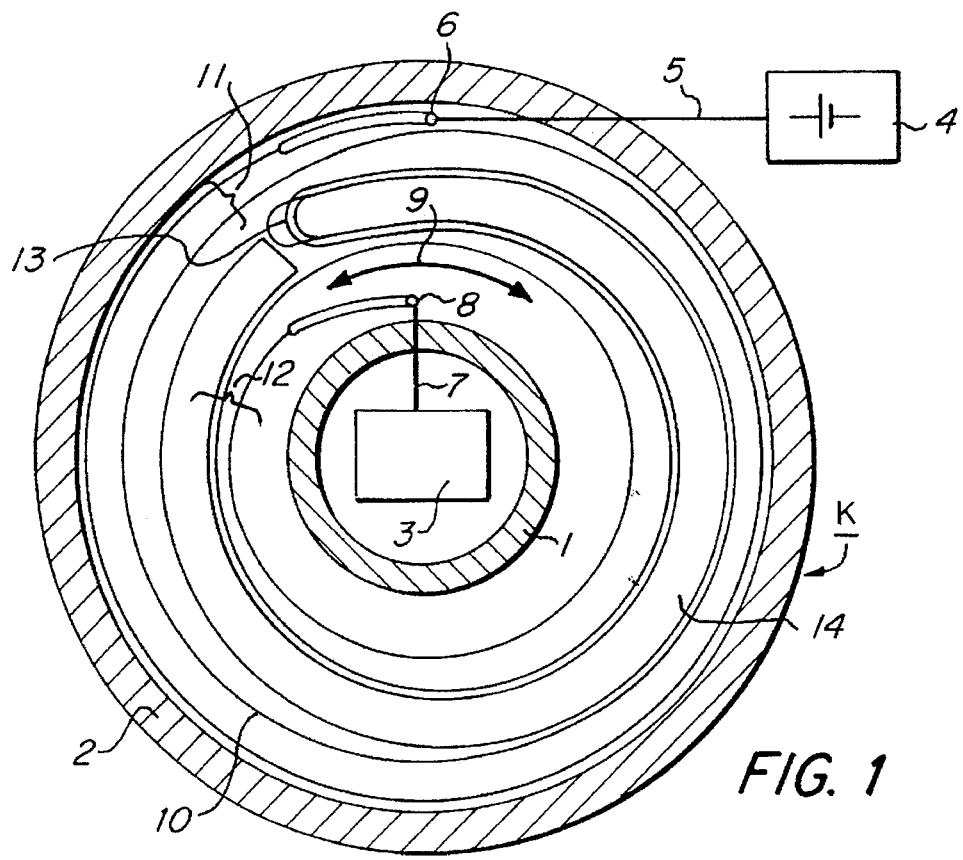
FIG. 1 is a schematic illustration of a cassette for the transmission of signals.

FIG. 1 schematically illustrates two circular walls 1 and 2 of an essentially circular cassette K. It is intended for installation in the steering wheel of a motor vehicle. In the illustrated configuration example, the wall 1 can belong to the rotor of cassette K, while the wall 2 is a part of its stator. The cassette K is connected to the battery 4 of the motor vehicle, for supplying current to the electronics 3, whose signal can trigger the release of an air bag. The battery 4 is connected through an electric line 5 to a fixed point terminal 6 on the cassette K. The electronics 3 are connected through an electric line 7 to a terminal 8 on the cassette K, which is able to move in the direction of the double arrow 9. Basically, terminal 8 could be stationary as well, and the terminal 6 could be moveable. Or both terminals 6 and 8 could be moveable.

A flat ribbon line 10 with at least two electric conductors is located between the two terminals 6 and 8. The conductors are preferably flat conductors. This configuration of the flat ribbon line 10 is particularly thin and therefore occupies very little space. Basically, the flat ribbon line 10 could contain round conductors as well. The construction of the flat ribbon line 10 and its type of connection to the terminals 6 and 8 are not illustrated in great detail. They are known in principle in different variations and are not significant here.

According to FIG. 1, the cassette K contains turns between the two terminals 6 and 8, which are subdivided into an outer winding area 11 and an inner winding area 12. The two winding areas 11 and 12 are indicated by brackets. In the central or mounted position of cassette K illustrated in FIG. 1, each contains two to three turns. The flat ribbon line 10 is wound in opposite directions in the two winding areas 11 and 12. An approximately U-shaped reversing area 13 connects the winding areas 11 and 12 to each other. A one-piece ring-shaped guide 14, which surrounds the reversing area 13, is located between the two winding areas 11 and 12.

The guide 14 can easily move in the peripheral direction of cassette K, thus in the direction of the double arrow 9. It may be constructed as a closed ring with a passage for the reversing area 13 of the flat ribbon line 10. However, it may also be an open ring extending nearly 360°, as depicted in FIG. 1. This makes it very light, so that it can easily and nearly noiselessly move inside the cassette K. A more precise configuration of the guide 14 can be seen in FIGS. 2 and 3.

Figure 2:
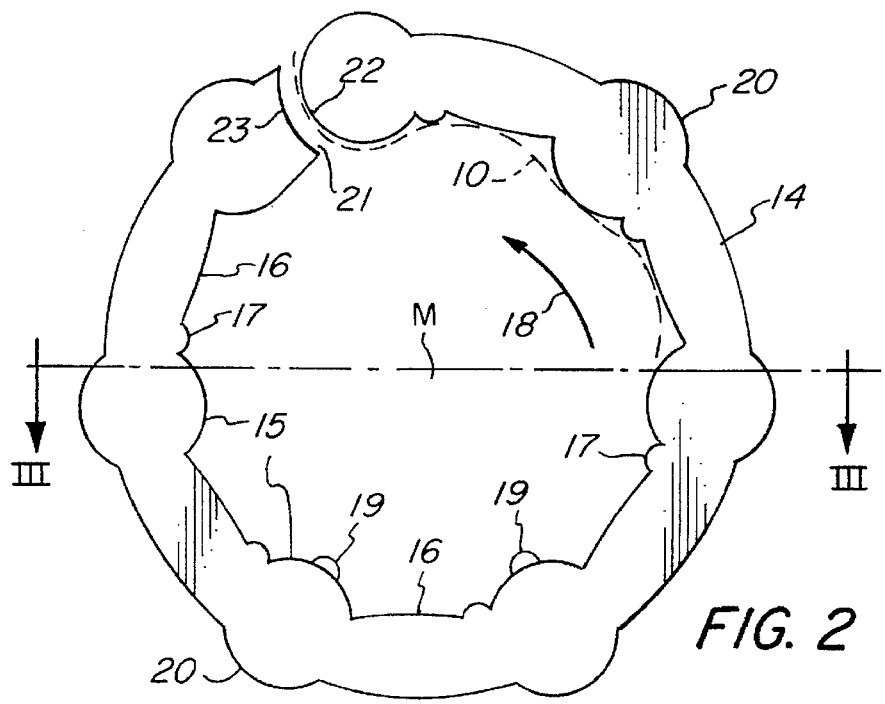
FIG. 2 is a top view of a guide that can be used in the cassette.
Figure 3:
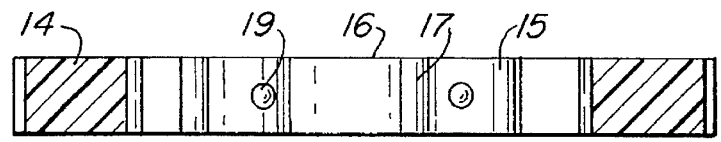
FIG. 3 is a cross-sectional view along line III—III of FIG. 2.

The guide 14 illustrated in FIG. 2 has protrusions 15 on its inside surface, which are offset with respect to each other in the peripheral direction. From there, the protrusions 15 extend radially in the direction of the center point M of guide 14. Their height corresponds to the width of the flat ribbon line 10 in cassette K. They are preferably curved convex, as illustrated in FIG. 2. Between the protrusions 15, the guide 14 has convex curved walls 16, whose minimum distance from the center point M is larger than the minimum distance of the protrusions 15 from the same point.

A nub 17 is located in each transition area between a wall 16 and a protrusion 15, whose minimum distance from the center point M of guide 14 is larger than the minimum distance of the protrusion 15 but smaller than the minimum distance of the wall 16, from the same point. The nubs 17 are located on the side of the walls 16 that faces away from the rotating direction (indicated by the arrow 18) of the guide 14 when the diameter of the inner winding area 12 of the flat ribbon line 10 increases. Basically, a corresponding nub could also be located on the other side of the protrusions 15. Instead of only one nub 17, two or more correspondingly stepped nubs could also be provided, which would usefully fill the transition area between the wall 16 and protrusion 15, for example in the form of a chain line. The nubs 17 could be constructed as spherical caps.

The respective distance of nubs 15, walls 16 and nubs 17 from the center point M of the guide 14 is designated as the "minimum distance", because in addition to the walls 16, the protrusions 15 and the nubs 17 are also curved convex. The resulting contact surface for the outer turn of the flat ribbon line 10 in the inner winding area 12 is thereby kept small. It can be further reduced if outward protruding spherical caps 19 are centrally located on the protrusions 15 according to FIG. 3, against which the turns of line 10 could rest. FIG. 2 illustrates spherical caps 19 on two protrusions 15.

In the illustrated configuration example, protrusions 20 are provided on the outer surface of the guide 14, which extend radially outward and are offset with respect to each other in the peripheral direction. According to FIG. 2, the protrusions 20 are positioned directly opposite of the protrusions 15 and with them complete a near circle. However, they can also be offset in the peripheral direction with respect to protrusions 15. The protrusions 20 serve as interrupted contact surfaces for the turns of the outer winding area 11 of the flat ribbon line 10.

In the illustrated configuration example, the reversing area 13 of the flat ribbon line 10 is located in a gap 21 in guide 14, which is provided between the two edges 22 and 23. In the direction of rotation of the rotor in cassette K which runs opposite to the one indicated by the arrow 18, the flat ribbon line 10 contacts the edge 22 in the reversing area 13. At that point, the guide 14 is pulled by the flat ribbon line 10. The diameter of the inner winding area 12 then decreases. In the other direction of rotation of the rotor in cassette K indicated by arrow 18, the reversing area 13 of the flat ribbon line 10 pushes the guide 14 when it contacts the edge 23. The diameter of the inner winding area 12 then increases, so that one of its turns contacts the guide 14.

In the direction of rotation of the rotor in cassette K indicated by arrow 18, the inner turns of the flat ribbon line 10 therefore wind into a larger diameter. They are moved by the movement of the rotor itself in the direction of arrow 18 and thus push the guide 14 in the same direction. At that point it could happen that the turn which contacts the flat ribbon line 10 slides into the relatively deep transition area between a protrusion 15 and a wall 16, where it gets jammed or buckled. This would impair the movement of the flat ribbon line 10 and the guide 14. The turn of the flat ribbon line 10 line is supported by the nubs 17. It thus remains slightly bent, as drawn by broken lines in FIG. 2. The turn of the flat ribbon line 10 line then contacts the guide 14 in a small total area, which then moves or slides trouble-free in the direction of arrow 18.

As mentioned earlier, the height of the protrusions 15 corresponds to the width of the flat ribbon line 10. This also applies fundamentally to the entire guide 14 with protrusions 15 and 20, as well as to nubs 17. The guide 14 could also be altogether lower or higher than the width of the line.

The preferred embodiment described above admirably achieves the objects of the invention. However, it will be appreciated that departures can be made by those skilled in the art without departing from the spirit and scope of the invention which is limited only by the following claims.

What is claimed is:

1. A device for transmitting signals between two terminals, the device comprising:
   (a) an essentially circular cassette comprising a stator that supports one of the terminals and a rotor which is able to rotate around its axis and with respect to the stator and which supports the other terminal;
   (b) at least one line stored in the cassette and being wound in turns, the at least one line being operationally connected between both terminals, the turns of the line are divided into an inner winding area and an outer winding area with different winding directions between which an approximately U-shaped reversing area is located; and
   (c) a ring-shaped guide encompassing the reversing area of the turns and located between the two winding areas, the ring-shaped guide made of a single piece and having a center point, the ring-shaped guide mounted for rotation in the peripheral direction of the cassette so that in one direction of rotation the diameter of the inner winding area increases and in the other direction of rotation the diameter of the inner winding area decreases, the ring-shaped guide having at least an inner periphery configured as a contact for the turns of the inner winding area, the ring-shaped guide having:
      (i) protrusions on the inner periphery that are offset with respect to each other in the peripheral direction and extend radially inward in a direction of the center point, the protrusions being spaced a minimum distance from the center point,
      (ii) convex curved walls between adjacent protrusions on the inner periphery, each convex curved wall being spaced a minimum distance from the center point which is larger than the minimum distance of its associated protrusions from the center point, and
      (iii) at least one nub located in transition areas between the convex curved walls and the protrusions and at least on sides of the convex curved walls that face away from the direction of rotation of the guide when the diameter of the inner winding area increases, each at least one nub has a smaller minimum distance from the center point than its associated convex curved wall, but a larger minimum distance from the center point than its associated protrusion.

2. A device as claimed in claim 1, wherein the protrusions are curved convex and have a height that corresponds to a height of the line.

3. A device as claimed in claim 1, further including radially extending spherical caps located on the protrusions.

* * * * *

UNITED STATES PATENT AND TRADEMARK OFFICE
CERTIFICATE OF CORRECTION

PATENT NO. : 5,649,832
DATED : July 22, 1997
INVENTOR(S) : Klaus-Uwe Wolf

It is certified that error appears in the above-indentified patent and that said Letters Patent is hereby corrected as shown below:

In the Abstract, in line 1, "or" should be --for--.

Col. 6, line 6, "of" should be --toward--.

Signed and Sealed this

Ninth Day of September, 1997

*Attest:*

BRUCE LEHMAN

*Attesting Officer*  *Commissioner of Patents and Trademarks*